United States Patent [19]

Miyazaki et al.

[11] Patent Number: 4,785,762

[45] Date of Patent: Nov. 22, 1988

[54] APPARATUS FOR FORMING FILM

[75] Inventors: Toshihiko Miyazaki, Tokyo; Etsuko Sugawa, Machida; Yoshinori Tomida; Hirohide Munakata, both of Yokohama; Yukuo Nishimura, Sagamihara; Ken Eguchi, Yokohama, all of Japan

[73] Assignee: Canon Kabushiki Kaisha, Tokyo, Japan

[21] Appl. No.: 129,364

[22] Filed: Nov. 30, 1987

Related U.S. Application Data

[63] Continuation of Ser. No. 723,924, Apr. 16, 1985, abandoned.

[30] Foreign Application Priority Data

Apr. 19, 1984 [JP] Japan .................................. 59-77531
Apr. 19, 1984 [JP] Japan .................................. 59-77534

[51] Int. Cl.$^4$ .............................................. B05C 3/10
[52] U.S. Cl. ..................................... 118/402; 118/423; 118/425

[58] Field of Search ................. 118/402, 403, 423, 425; 405/63, 70, 71; 427/263, 281, 434.3

[56] References Cited

U.S. PATENT DOCUMENTS

| | | | |
|---|---|---|---|
| 4,490,413 | 12/1984 | Stimson | 427/263 X |
| 4,511,604 | 4/1985 | Barraud et al. | 427/402 |
| 4,674,436 | 6/1987 | Miyazaki et al. | 118/402 |

Primary Examiner—Evan Lawrence
Attorney, Agent, or Firm—Fitzpatrick, Cella, Harper & Scinto

[57] ABSTRACT

An apparatus is provided for forming a monomolecular film or a monomolecular layer built-up film on a substrate by spreading a group of monomolecular film-forming molecules on a liquid surface and contacting the substrate with the group of the monomolecular film-forming molecules. The apparatus comprises a frame for confining the spread liquid surface and structure for isolating and moving at least two different monomolecular layers on the spread liquid surface within the frame.

5 Claims, 6 Drawing Sheets

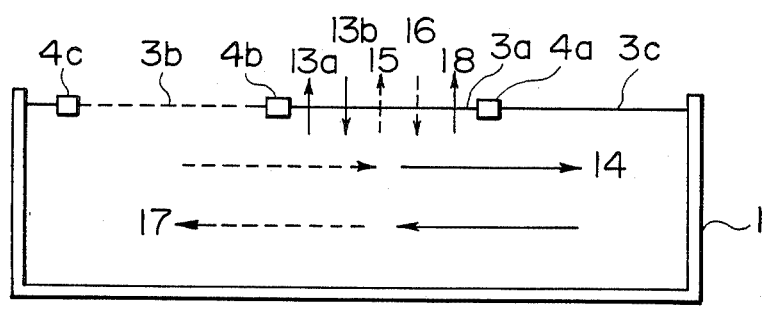
F I G. 1
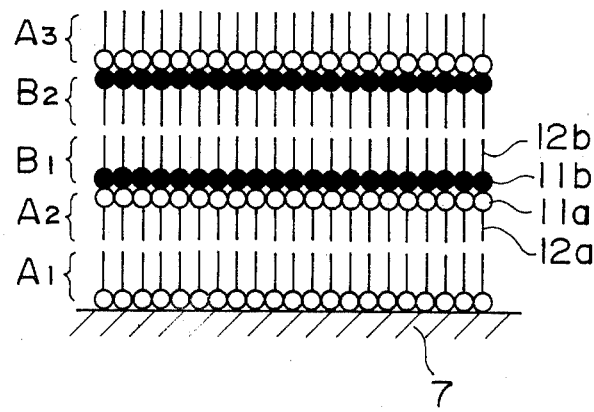
F I G. 2

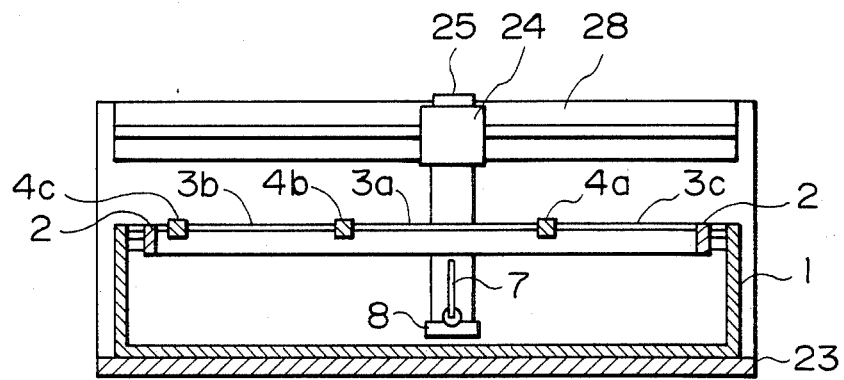
F I G. 5(a)
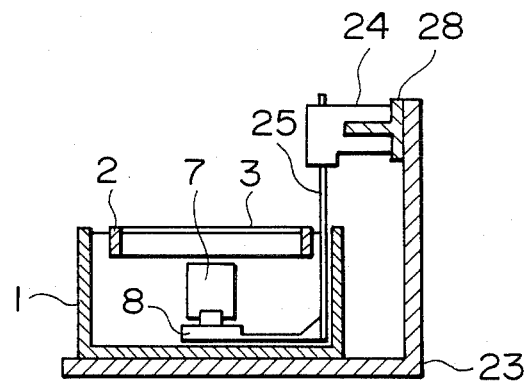
F I G. 5(b)

APPARATUS FOR FORMING FILM

This application is a continuation of application Ser. No. 723,924 filed Apr. 16, 1985, now abandoned.

BACKGROUND OF THE INVENTION

1. Field of the Invention

This invention relates to an apparatus for forming a film, suitable for forming a monomolecular film, or a monomolecular layer-built-up film, i.e. a laminate of monomolecular layers, which will be hereinafter referred to as "LB film", and particularly to an apparatus for forming a film, which is distinguished in forming films having various built-up structures, where different monomolecular layers are laid one upon another.

2. Description of the Prior Art

Heretofore, inorganic materials with relatively easy handling characteristics have been mostly utilized in the fields of semi-conductor technique and optical technique, partly because the technical progress in the field of organic materials was considerably retarded, as compared with that in the field of inorganic materials.

However, the recent rapid technical progress in the field of organic materials is quite remarkable and also it is often said that the development of inorganic materials is approaching their limit. Thus, development and research for novel organic functional materials that can surpass the inorganic functional materials are now keenly desired.

Organic materials enjoy such advantages as low cost, easy production, high functionality, etc. Though the organic materials have been so far regarded as poor materials in heat resistance and mechanical strength, novel organic materials, which have overcome these disadvantages, have been recently made available one after another. Under such recent technical situations, it has been proposed by some research organizations to make some or all of the parts, mainly film parts, which play the function of a logic element, a memory element, photoelectric converter element, etc. as in integrated circuit devices, or the function of a microlens array, an optical waveguide, etc. as in optical devices, from an organic film in place of the conventional inorganic film, as well as to make a molecular electron device in which one organic molecule is made to play the function of a logic element, a memory element, etc., or even to make logic elements from bio-related substances, for example, bio-chips.

The organic film as the main constituent for such devices can be prepared according to a monomolecular layer building up technique. The monomolecular layer building up technique, which may be also called "Langmuir-Blodgett's technique" or "LB technique", is a method comprising regularly spreading molecules each having a hydrophilic group and a hydrophobic group on water by utilizing the hydrophilic and hydrophobic properties of the molecules, thereby forming a monomolecular film thereon, and then transferring the monomolecular film onto the surface of a substrate, where it is possible to form a monomolecular film or a monomolecular layer built-up film, i.e., a laminate of monomolecular layers, on the substrate.

The conventional apparatus for forming such a film has a structure as shown in FIG. 6. That is, a frame 2 is provided within a shallow, broad rectangular water vat 1 to partition the water surface 3. The frame 2 works as a two-dimensional cylinder, and a rectangular float 4 is provided on the water surface within the frame 2. The width of float 4 is a little smaller than the inner width of frame 2 and the float 4 can be smoothly moved horizontally, that is, toward the left or right side on the drawing, as a two-dimensional piston. To move the float 4 horizontally, the float 4 is connected to a winder 6 driven, for example, by a motor, or the like, through a wire 5.

To form a monomolecular film, a monomolecular film-forming substance is dissolved in a volatile solvent such as benzene, chloroform, etc., and a drop of the resulting solution is added to the water surface 3. After evaporation of the solvent, a monomolecular film showing a two-dimensional behavior remains on the water surface 3. When the surface density of the molecules is low, the film is called a two-dimensional gaseous film. By moving the float 4 toward the right side, the extension of the water surface 3 on which the monomolecules are spread is contracted to increase the surface density. Thus, the intermolecular action is so intensified that the gaseous film is changed to a two-dimensional solid film through the intermediate stage of a two-dimensional liquid film. In the solid film, the arrangement and orientation of the molecules become regular and uniform, and the high orderliness and uniform ultra-thin filminess required for the semi-conductor constituent materials can be obtained.

To transfer the monomolecular film from the water surface 3 onto the surface of substrate 7, a vertical dipping technique is used, where the substrate 7 fixed to a substrate holder 8 is moved in a vertical direction 9, while applying a suitable constant surface pressure for the building-up operation to the monomolecular film on the water surface 3, thereby transferring the monomolecular film onto the substrate 7. The technique includes 3 types, i.e., type X, in which a monomolecular film 10 is deposited onto the substrate 7, only when the substrate 7 is dipped, as shown in FIG. 7(a); type Y, in which the monomolecular film 10 is deposited onto the substrate 7, also when the substrate is pulled up, as shown in FIG. 7(b); and type Z, in which the monomolecular film 10 is deposited onto the substrate 7, only when the substrate is pulled up, as shown in FIG. 7(c). In FIG. 7, numeral 11 shows the hydrophilic moiety of the molecule, whereas numeral 12 shows the hydrophobic moiety of the molecule.

When, for example, a built-up film shown in FIG. 2 is to be formed as a type Y heterogeneous monomolecular layers-built-up film, which is a laminate of different monomolecular layers laid one upon another in the building-up direction [see FIG. 7(b)], that is, when hetero junctions are to be provided between the hydrophilic groups 11a of film A and the hydrophilic groups 11b of film B, the substrate is moved vertically and reciprocally to deposit films $A_1$ and $A_2$, and, then, while the substrate is made to stay dipped in the water, the monomocular film A on the water surface is discarded to clean the water surface. Then, a monomolecular film B is formed on the cleaned water surface, and the substrate is again moved vertically and reciprocally to deposit films $B_1$ and $B_2$. Further film A can be likewise deposited.

For the monomolecular film exchange, on the water surface, said apparatus will require much time in cleaning the water surface, and much more time as one increases the number of different monomolecular films. Furthermore, the water surface may be rippled or the water level may fluctuate at the cleaning of the water surface for the monomolecular film exchange, with the result, that the film formed on such water surface cannot be uniformly deposited onto the substrate and thus cannot be used for the building-up.

As described above, the conventional apparatus requires much time and labor in forming a built-up film, i.e., a laminate of different monomolecular layers on a substrate, and has the disadvantage of unavoidably requiring the discarding of the useful monomolecular film as waste.

SUMMARY OF THE INVENTION

The present invention has been established to overcome the disadvantages of the conventional apparatus, and one object of the present invention is to provide an apparatus for forming a film, which can form a heterogeneous monomolecular layer built-up film, in which different monomolecular layers are regularly and uniformly laid one upon another, in a shorter time with less labor.

The present invention provides an apparatus for forming a monomolecular film or a monomolecular layer built-up film on a substrate by spreading a group of monomolecular film-forming molecules on a liquid surface and contacting the substrate with the group of the monomolecular film-forming molecules, which comprises a frame for confining the spread liquid surface and a means for partitioning the spread liquid surface within the frame.

The present invention further provides an apparatus for forming a monomolecular film or a monomolecular layer built-up film on a substrate by spreading a group of monomolecular film-forming molecules on a liquid surface and contacting the substrate with the group of the monomolecular film-forming molecules, which comprises a circular frame and a float means for isolating at least two different group of monomolecular film-forming molecules so as not to allow them to mix with one another within the frame.

The present invention still further provides an apparatus for forming a monomolecular film or a monomolecular layer built-up film on a substrate by spreading a group of monomolecular film-forming molecules on a liquid surface and contacting the substrate with the group of the monomolecular film-forming molecules, which comprises a means for partitioning a spreading liquid surface, and a driving means for moving the partitioning means while keeping the monomolecular film-forming molecules in a isolated state.

The present invention still further provides an apparatus for forming a monomolecular film or a monomolecular layer built-up film on a substrate by spreading a group of monomolecular film-forming molecules on a liquid surface and contacting the substrate with the group of the monomolecular film-forming molecules, which comprises, for example a means for isolating at least two different groups of monomolecular film-forming molecules spread on the liquid surface in the same spreading liquid vat so as not to mix with each other, and a driving means for moving the isolating means while keeping the different groups of the monomolecular film-forming molecules in an isolated state.

BRIEF DESCRIPTION OF THE DRAWINGS

FIG. 1 is a schematic view of one embodiment according to the present invention.

FIG. 2 is a structural view of one embodiment of a heterogeneous monomolecular layer-built-up film produced by mean the present invention.

FIG. 3 shows another embodiment according to the present invention, wherein

FIG. 5 shows still another embodiment according to the present invention, wherein FIG. 5(a) is its cross-sectional front view, and FIG. 5(b) is its cross-sectional side view.

DETAILED DESCRIPTION OF THE PREFERRED EMBODIMENTS

Figure 3A:
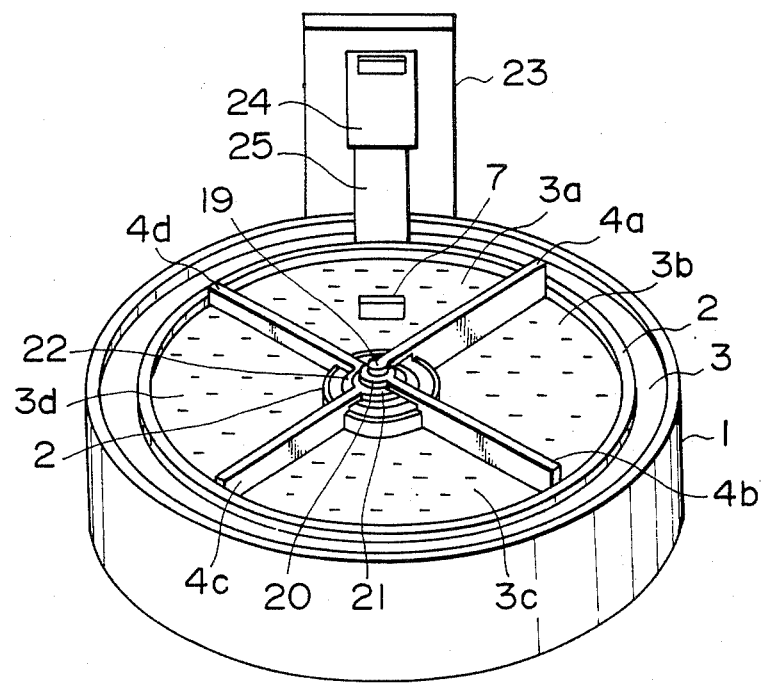
FIG. 3(a) is its perspective view and FIG. 3(b) is a partial plan view of the essential part of its driving means.

The present invention will be described in detail, referring to the drawings.

One embodiment of the present film-forming apparatus is shown in FIG. 1. Floats 4a, 4b and 4c are provided on a liquid surface in a rectangular water vat 1 as a spreading liquid vat as means for isolating at least two of different monomolecular films formed on the liquid surface to divide the liquid surface into three water surface sections 3a, 3b and 3c so that the films may not be mixed. A drop of monomolecular film-forming substance A is added to the water surface section 3a, and a drop of monomolecular film-forming substance B is added to the water surface section 3b. The floats 4a, 4b and 4c are moved by a driving means (not shown in the drawing) to apply desired surface pressures to the films A and B on the water surface sections 3a and 3b, respectively.

Then, a substrate is moved vertically in the film A section in the arrow direction 13a and then the arrow direction 13b. Then, while the substrate is made to stay as dipped in the water, the floats 4a, 4b and 4c are moved in the arrow direction 14, while keeping the monomolecular film in an isolated state. Then, the substrate is moved vertically in the film B section in the arrow direction 15 and then the arrow direction 16. Then, the floats are moved in the arrow direction 17 in the same manner as above, and then the substrate is pulled up in the arrow direction 18 to pass across the film A, whereby monomolecular films A and B are transferred onto the substrate. As a result, a monomolecular layer-built-up film having hetero junctions between the hydrophilic groups and the hydrophobic groups as shown in FIG. 2 can be simply formed. When molecules having a function on the hydrophilic group moiety are built up, the resulting built-up film has the advantage that the functional moieties of the different molecules are located close to each other.

As described above, the present invention provides an apparatus capable of moving at least two kinds of monomolecular films while keeping the film in an isolated state avoiding mixing of one another.

The substrate can move not only vertically, but also horizontally in water together with the vertical movement.

Figure 3B:
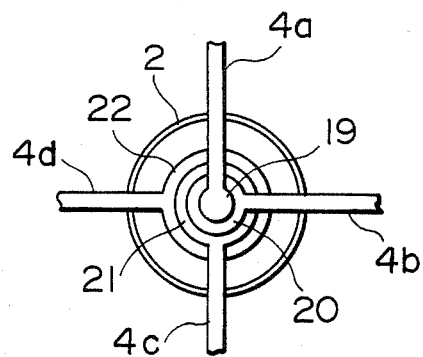

An apparatus according to another embodiment of the present invention is shown in FIG. 3, where the spreading liquid vat is a circular water vat to build up a plurality of different monomolecular layers. FIG. 3(a) is a perspective view of the apparatus, and FIG. 3(b) is a partial plan view of the essential part of its movable means. A frame 2 is horizontally provided on water surface 3 within a circular water vat 1 as a spreading liquid vat. The water surface within the frame 2 is partitioned into four water surface sections, 3a, 3b, 3c, and 3d by floats 4a, 4b, 4c, and 4d, whereby four different monomolecular films formed in the water surface sections are isolated so as not to mix with another.

The floats 4a, 4b, 4c and 4d are fixed to the respective rotatable shafts 19, 20, 21 and 22, and the respective rotatable shafts are engaged with one another coaxially and are rotatable independently. The respective rotatable shafts are further connected to individual motors under the water vat, and by driving the motors, the floats can be rotatably moved while keeping the monomolecular layers in an isolated state so as not to mix with one another.

Vertical movement of substrate 7 can be made by vertically movable rail 25 through a motor in a moving mechanism 24 mounted on a base 23. A base holder similar to that shown by numeral 8 in FIG. 5 is provided at the lower, water-dipped part of the vertically movable rail 25, and the substrate 7 is fixed to the substrate holder. Individual floats 4a, 4b, 4c, and 4d are provided with surface pressure gages (not shown in the drawing), and the surface pressures of the monomolecular films spread on the water surface sections 3a, 3b, 3c, and 3d can be adjusted, as desired, by moving the floats. Drops of the individual monomolecular film-forming sub stances A, B, C and D are added to the respective water surface sections 3a, 3b, 3c and 3d to form monomolecular films A, B, C and D while giving thereto surface tensions by the individual floats. By vertical movement of the substrate and rotational movement of floats, a heterogeneous monomolecular layers-built up film can be readily formed.

In the present invention, the monomolecular films can be formed in all the individual four water surface sections, as described above, but in view of the state of monomolecular films, that is, when too high a surface pressure may be applicable to the monomolecular films by the movement of floats, it is desirable to leave one water surface section free from the formation of a monomolecular film or in a state of a gaseous film.

In the embodiment shown in FIG. 3, the water surface is partitioned into four water surface sections, but the number of the water surface sections can be, of course, selected as desired. In FIG. 3 only one mechanism for mounting a substrate is shown, but two or more mechanisms can be provided. When the monomolecular film-forming substances become deficient, it is possible to make up for the consumption by a means for adding drops of the film-forming substances to the water surface sections.

Figure 4:
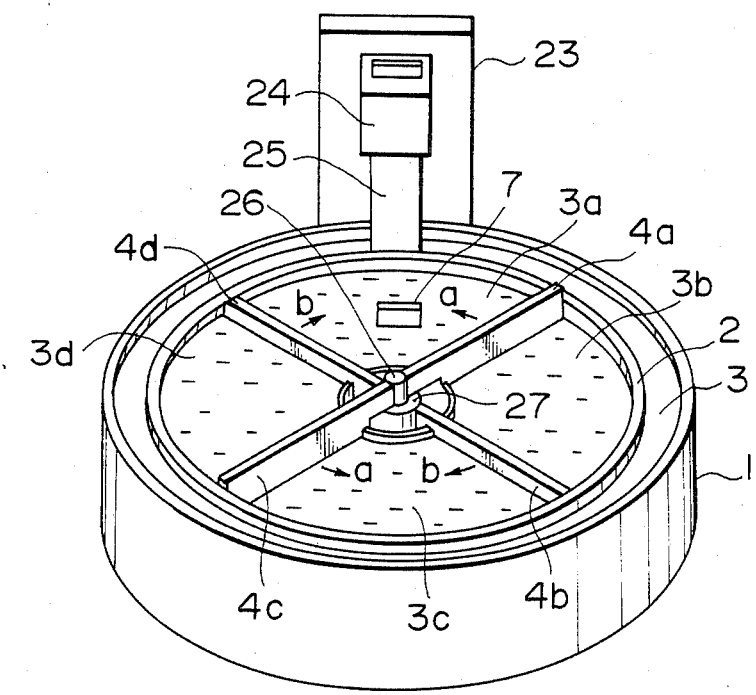
FIG. 4 is a perspective view of an other embodiment according to the present invention.

In FIG. 4, an apparatus according to another embodiment of the present invention is shown, where a circular water vat is used, but the float-moving means are different from those shown in FIG. 3. That is, floats 4a, 4b, 4c and 4d are grouped into two, and two opposite floats 4a and 4c are fixed to one and same rotatable shaft 26, while another two opposite floats 4b and 4d are fixed to another rotatable shaft 27. The rotatable shafts 26 and 27 are engaged with each other coaxially and are rotatable independently by motors under the water vat, as connected to the respective rotatable shafts. For example, by rotatably moving the floats in directions a and b in FIG. 4, different monomolecular films are formed on water surface sections 3a and 3c, and thus the floats can be moved while keeping the different monomolecular films in an isolated state with each other.

An apparatus according to still other embodiment of the present invention is shown in FIG. 5, where FIG. 5(a) is a cross-sectional front view and FIG. 5(b) is a cross-sectional side view. A frame (partition wall) 2 is horizontally provided within a rectangular water vat 1, and floats 4a, 4b and 4c are provided on the water surface within the frame 2 to partition the water surface into three sections 3a, 3b and 3c. The water surface sections 3a and 3b can be adjusted to any desired constant surface pressure by a movable means and surface tension gages (not shown in the drawing). A substrate 7 is fixed to a substrate holder 8, and can be vertically moved by a vertically movable rail 25 through a motor provided in a moving mechanism 24 for vertically and horizontally moving the substrate.

Figure 6:
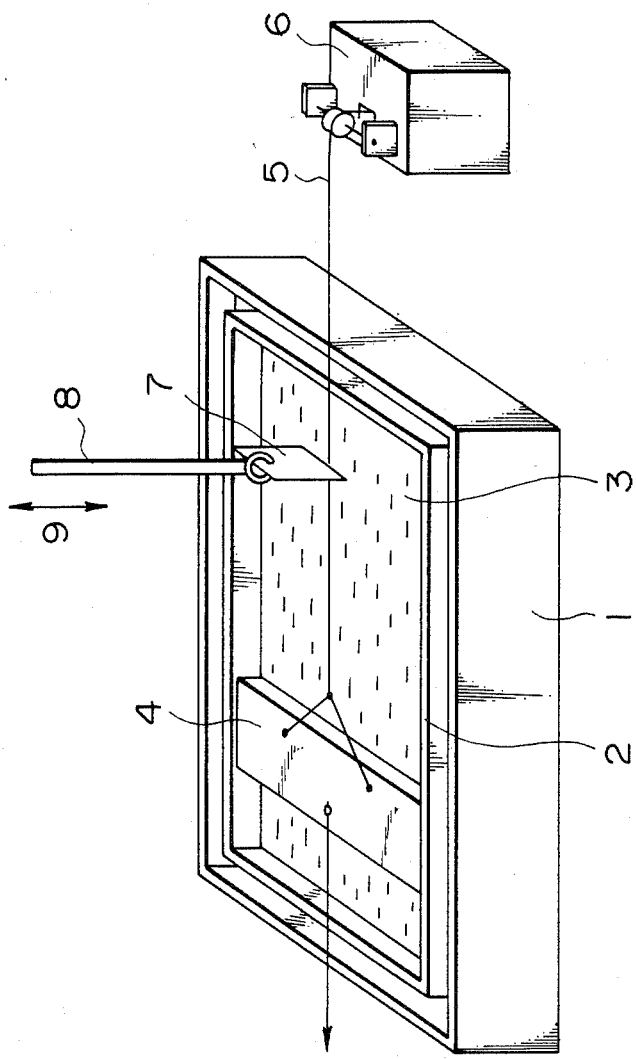
FIG. 6 is a perspective view of the conventional film-forming apparatus.
Figure 7A:
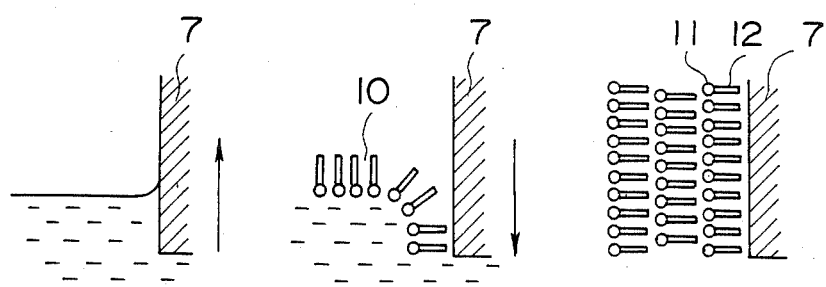
FIG. 7 is a schematic view showing the molecular orientation structure of an LB film, where (a) shows type X; (b) shows type Y; and (c) shows type Z.
Figure 7B:
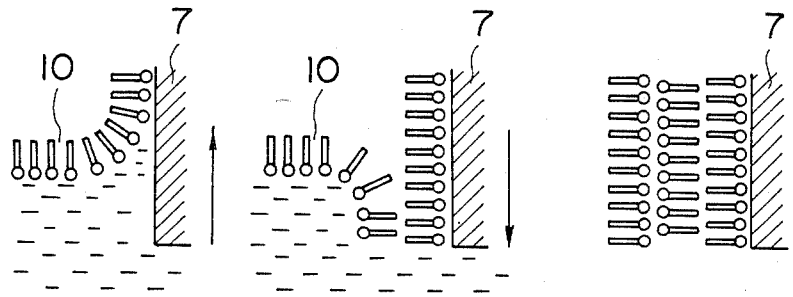
Figure 7C:
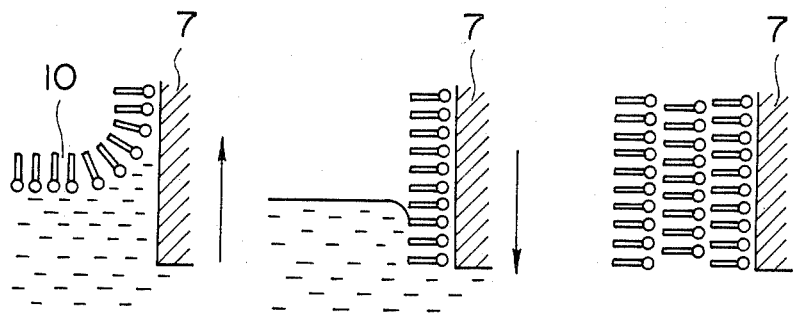

The substrate holder 8, to which the substrate 7 is fixed, can be moved horizontally, that is, towards the left side or the right side on the drawing along a rail 28 for horizontal movement by the motor in the moving mechanism 24 through the rail 25 for vertically moving the substrate. After the substrate 7 is dipped into water, a drop of monomolecular film-forming substance A is added, for example, to the water surface section 3a, whereas a drop of monomolecular film-forming substance B is added to the water surface section 3b. By giving thereto desired surface tensions by the floats 4a, 4b and 4c, monomolecular films A and B are formed in the respective water surface section. Then, by vertically moving the substrate 7 across the water surface section 3a, film A is deposited onto the substrate. Then, the floats are moved, and by likewise vertical movement of the substrate across the water surface section 3b, film B is deposited on the substrate, whereby a heterogeneous monomolecular layer built-up film as shown in FIG. 2 can be readily formed. Floats can be moved according to the conventional moving means, for example, the means shown in FIG. 6, using the frame 2 as a two-dimensional cylinder and the floats as two-dimensional pistons, where the floats can be moved smoothly in a horizontal direction by pulling or pushing wires 5 connected to the respective floats by winders 6 using motors, etc. The apparatus shown in FIG. 5 can be applied to an overhead substrate-suspension type deposition procedure as used in the conventional apparatus shown in FIG. 6 by exchanging the substrate holder 8 and the vertically movable rail with those for the overhead suspension type. The present apparatus is also applicable to the horizontal deposition procedure and a rotating cylinder procedure.

As described above, the present apparatus is provided with a means for isolating at least two or different groups of monomolecular films formed on the liquid surface in a spreading liquid vat so as not to mix with one another, and a driving means for moving the said isolating means while keeping the different groups of the monomolecular films in the isolated state, and thus a heterogeneous monomolecular layer built-up film made of at least two of different monomolecular layers can be continuously and readily formed on a substrate by simple operations of moving the isolating means on and along the liquid surface in one spreading liquid vat without exchanging the monomolecular film-forming substances as encountered in the conventional apparatus.

What is claimed is:

1. An apparatus for forming on a substrate a heterogeneous built-up film made of different monomolecular layers, comprising:
 a vessel for holding a liquid;
 a frame located within the vessel for confining the surface of the liquid on which monomolecular layer-forming molecules are to be spread;
 a plurality of means for isolating on the liquid surface at least two monomolecular layers that differ from one another;
 means for moving each isolated monomolecular layer on said liquid surface while maintaining a surface pressure of said monomolecular layer at a desired value by moving said plurality of isolating means in the same direction; and
 means for transferring a moved monomolecular layer onto said substrate.

2. An apparatus according to claim 1, wherein said isolating means includes at least one float.

3. An apparatus for forming on a substrate a heterogeneous built-up film made of different monomolecular layers, comprising:
 a vessel for holding a liquid;
 a frame located within the vessel for confining a surface of the liquid on which monomolecular layer-forming molecules are to be spread, the geometry of both said vessel and said frame defining approximately circular regions;
 means for isolating on the liquid surface at least two monomolecular layers that differ from one another, said isolating means including at least one rotatable shaft;
 means for independently moving each of the different monomolecular layers, said moving means being responsive to rotation of said rotatable shaft; and
 means for transferring a moved monomolecular layer onto said substrate.

4. An apparatus according to claim 3, wherein said isolating means includes at least one float.

5. An apparatus according to claim 3, wherein the moving means includes at least one float fixed to the rotatable shaft.

* * * * *